United States Patent [19]
Dauber et al.

[11] Patent Number: 5,916,671
[45] Date of Patent: Jun. 29, 1999

[54] REUSABLE RESILIENT GASKET AND METHOD OF USING SAME

[75] Inventors: Edwin G. Dauber, Chesapeake City; Daniel E. Hubis, Elkton, both of Md.; Gordon L. McGregor, Landenberg, Pa.; Raymond B. Minor, Elkton; William P. Mortimer, Jr., Conowingo, both of Md.

[73] Assignee: W. L. Gore & Associates, Inc., Newark, Del.

[21] Appl. No.: 08/802,649

[22] Filed: Feb. 18, 1997

Related U.S. Application Data

[63] Continuation of application No. 08/186,368, Jan. 24, 1994, abandoned, which is a continuation-in-part of application No. 07/023,642, Feb. 26, 1993, abandoned.

[51] Int. Cl.[6] ............................... B32B 5/18; C09J 7/02
[52] U.S. Cl. ............................... 428/317.3; 428/317.9; 428/319.3; 428/319.7; 428/319.9; 428/343; 428/354
[58] Field of Search .............................. 428/317.3, 317.9, 428/319.3, 319.7, 319.9, 343, 354

[56] References Cited

U.S. PATENT DOCUMENTS

| | | | |
|---|---|---|---|
| 3,198,856 | 8/1965 | Hammond et al. | 264/5 |
| 3,615,972 | 10/1971 | Morehouse, Jr. et al. | 156/79 |
| 3,953,566 | 4/1976 | Gore | 264/288 |
| 4,098,945 | 7/1978 | Oehmke | 428/327 |
| 4,108,806 | 8/1978 | Cohrs et al. | 521/54 |
| 4,153,661 | 5/1979 | Ree et al. | 264/120 |
| 4,273,806 | 6/1981 | Stechler | 427/119 |
| 4,304,713 | 12/1981 | Perelman | 264/45.9 |
| 4,320,076 | 3/1982 | Greenwood | 264/35 |
| 4,335,044 | 6/1982 | Hedrich | 548/475 |
| 4,373,519 | 2/1983 | Errede et al. | 128/156 |
| 4,483,889 | 11/1984 | Andersson | 427/389.9 |
| 4,663,095 | 5/1987 | Battais | 264/45.9 |
| 4,837,251 | 6/1989 | Okey et al. | 523/218 |
| 4,946,737 | 8/1990 | Lindeman et al. | 428/283 |
| 4,959,395 | 9/1990 | Janda | 521/54 |
| 4,985,296 | 1/1991 | Mortimer, Jr. | 428/220 |
| 4,990,544 | 2/1991 | Asaumi et al. | 521/145 |
| 4,996,097 | 2/1991 | Fischer | 428/220 |
| 5,023,279 | 6/1991 | Buckmaster et al. | 521/85 |
| 5,026,591 | 6/1991 | Henn et al. | 428/198 |
| 5,061,561 | 10/1991 | Katayama | 428/364 |
| 5,110,998 | 5/1992 | Muschiatti | 174/24 |
| 5,115,103 | 5/1992 | Yamanishi et al. | 174/24 |
| 5,128,175 | 7/1992 | Yamanishi et al. | 427/54.1 |
| 5,132,061 | 7/1992 | Lindeman et al. | 264/45.3 |
| 5,155,138 | 10/1992 | Lundqvist | 521/76 |
| 5,209,967 | 5/1993 | Wright et al. | 428/283 |
| 5,238,621 | 8/1993 | Hagen et al. | 264/45.3 |
| 5,292,578 | 3/1994 | Kolzer | 428/240 |

FOREIGN PATENT DOCUMENTS

| | | |
|---|---|---|
| 910032350 | 5/1991 | Japan . |
| 910162363 | 10/1991 | Japan . |
| 1589022 | 5/1981 | United Kingdom . |
| 9300390 | 1/1993 | WIPO . |

OTHER PUBLICATIONS

"Microcellular Foams," Plastics Technologies (Feb. 1993)
Expancel—Advertisement of Nobel Industries Sweden (date and author unknown).
Polymer Report—K. L. Alderson and K. E. Evans—"The Fabrication of microporous polyethylene having a negative Poisson's ratio" 33 Polymer 4435–38 (1993).
International Search Report for PCT/US94/04910.

*Primary Examiner*—Jenna Davis
*Attorney, Agent, or Firm*—Carol A. Lewis White

[57] ABSTRACT

An improved gasket particularly suitable for use in sensitive environments is disclosed. The preferred gasket of the present invention comprises at least one layer of a composite material of porous polytetrafluoroethylene (PTFE) polymer and resilient expandable microspheres. The composite material provides a number of significant advantages over existing PTFE and similar clean gaskets, including better seal under less compressive pressure, sufficient resilience to permit reuse, and retained porosity—allowing pressure equalization in the equipment to occur through the gasket itself.

12 Claims, 5 Drawing Sheets

REUSABLE RESILIENT GASKET AND METHOD OF USING SAME

RELATED APPLICATIONS

This application is a continuation of application Ser. No. 08/186,368, filed Jan. 24, 1994 now abandoned. The Ser. No. 08/186,368 is a continuation-in-part of U.S. patent application Ser. No. 07/023,642, filed Feb. 26, 1993 now abandoned.

BACKGROUND OF THE INVENTION

1. Field of the Invention

The present invention relates to resilient, reusable gaskets, and particularly to gaskets for use in sensitive equipment such as computer disk drives.

2. Description of Related Art

Gaskets formed from expanded polytetrafluoroethylene (PTFE) are widely employed today. These gaskets, typically made in accordance with the teachings of U.S. Pat. No. 3,953,566 issued Apr. 27, 1976, to Robert W. Gore, have a number of significant operating advantages, including cleanliness, high strength, chemical inertness, and high temperature resistance. Unfortunately, expanded PTFE material generally requires a significant amount of compression before achieving a proper seal. While the seal obtained with compressed expanded PTFE is a good one, repeat access through a sealed joint is limited. Like many other available gasket materials, once expanded PTFE gaskets are used they are permanently densified and have limited ability to be reused.

For use in sensitive electronic and optical enclosures, an expanded PTFE gasket is primarily of benefit due to its cleanliness. However, the need to repeatedly access some of these enclosures, and the substantial amount of densification required to properly seal some expanded PTFE materials, are significant concerns about using conventional expanded PTFE gaskets in such environments.

In particular, one such application is in computer disk drives where a clean resilient gasket is desired. Cleanliness is required both from a particulation standpoint as well as an out-gassing standpoint because particles as well as hydrocarbons, plasticizers and silicone out-gassing are problematic in operating the disk drive. Unfortunately, auguring against using expanded PTFE material, disk drives are typically sealed with only a few small screws so sealing force is severely limited.

The most common gaskets used in disk drives today are molded rubber or VITON gaskets, or closed cell polyolefin form gaskets. These gaskets have the benefits of being fairly inexpensive and not presenting a contamination risk by having limited "out-gassing." Regretfully, these gaskets typically have many deficiencies, such as: being difficult to handle, having limited reusability, and having limited sealability (with leaking of air occurring around some gaskets in certain applications). Additionally, in certain applications which are highly sensitive to contamination problems (e.g., in smaller and more complex disk drives), the amount of out-gassing which does occur with many of these gaskets is becoming an increasing concern.

What has not been available is a gasket that is a resilient, clean-polymeric gasket that is easily applied, easily removed, and easily reapplied with the stability required to make a good gasket seal. Additionally, it would be desirable to have a gasket with a number of other properties, such as: sufficient porosity to provide particle filtration capability as an air filter when installed; a gasket material which can be optionally loaded with an adsorbent or other reagent; a gasket which includes certain electromagnetic and/or thermal conducting or shielding properties; and a gasket which can protect against liquid contamination.

These and other purposes of the present invention will become evident from review of the following specification.

SUMMARY OF THE INVENTION

The present invention provides a clean, resilient, polymeric gasket that is reusable and is readily adaptable for use with various enhancements. Preferably, the gasket of the present invention comprises a mixture of polymer, such as polytetrafluoroethylene (PTFE) dispersion, and expandable thermoplastic microspheres with other optional components for additional desirable properties. By expanding the microspheres in the mixture through exposure to heat or other energy source, it has been determined that a three-dimensional scaffold or lattice network is formed of coherent expanded polymeric nodes and fibrils and expanded microspheres.

This scaffold has many of the same desirable properties of mechanically expanded PTFE such as cleanliness and chemical stability and also includes many additional beneficial properties such as unsintered dimensional stability, resilience and resistance to deformation, moldability, and selective expandability.

With adequate pressure, the gasket can form airtight seals to fairly high pressures. Alternatively, with lighter pressures, this resilient gasket can form a breathable gasket capable of filtering the air passing through it of undesirable particles. As such, in low pressure seal operations, such as in disk drives, the gasket of the present invention combines good gasketing properties, good sealing against particle contamination, and unique air filtration properties. Accordingly, the gasket of the present invention can be used to replace both a conventional gasket and a conventional inlet vent or breather filter.

Additionally, the gasket of the present invention can be supplied with a number of useful enhancements. Examples of possible options include: added adsorbent particles to the polymer mixture to further filter the air from unwanted vapor contaminants such as moisture, hydrocarbons, or corrosive acid gases; added conductive particles to the polymer mixture to supply a degree of electromagnetic interference shielding to the gasket or even a degree of electrical conductivity; the use of layers of other materials to the expandable polymeric gasket (e.g., the use of a stiffener or adhesive). In addition, a polymer film, such as polyester film, can be layered in several ways to add dimensional stability and resistance to stretching and tearing if desired. The film can be either layered by the use of adhesives or laminated directly to the polymer gasket ultrasonically or thermally.

DESCRIPTION OF THE DRAWINGS

The operation of the present invention should become apparent from the following description when considered in conjunction with the accompanying drawings, in which:

FIG. 2b is a side elevational view of the gasket of FIG. 2a;

DETAILED DESCRIPTION OF THE INVENTION

The present invention comprises an improved clean, resilient, polymeric gasket, and a method of using it. While the gasket of the present invention has many possible applications, it is particularly adapted for use in sensitive, ultra-clean environments, such as those encountered in electronic and optical fields.

Figure 1:
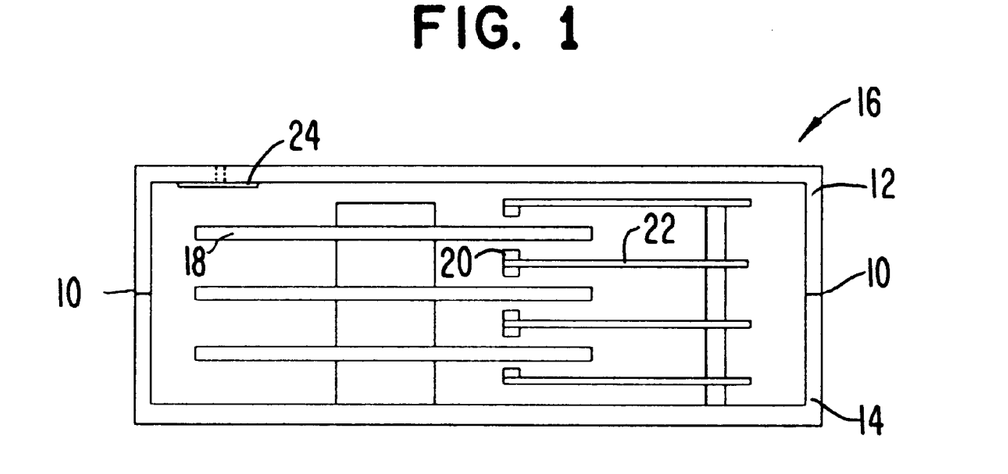
FIG. 1 is a schematic cross-sectional representation of a computer hard disk drive showing a gasket of the present invention mounted therein.

FIG. 1 illustrates one intended use of a gasket 10 of the present invention. The gasket 10 is shown mounted between a top half 12 and a bottom half 14 of a conventional hard disk drive 16. Hard disk drive components, such as magnetic disk recording media 18, read/write heads 20, and armatures 22 which position the read/write head over the magnetic media, are all highly sensitive to contamination. In order to allow for pressure equalization while protecting against particulate influx, a separate breather filter 24 is commonly used in these devices.

Figure 1A:
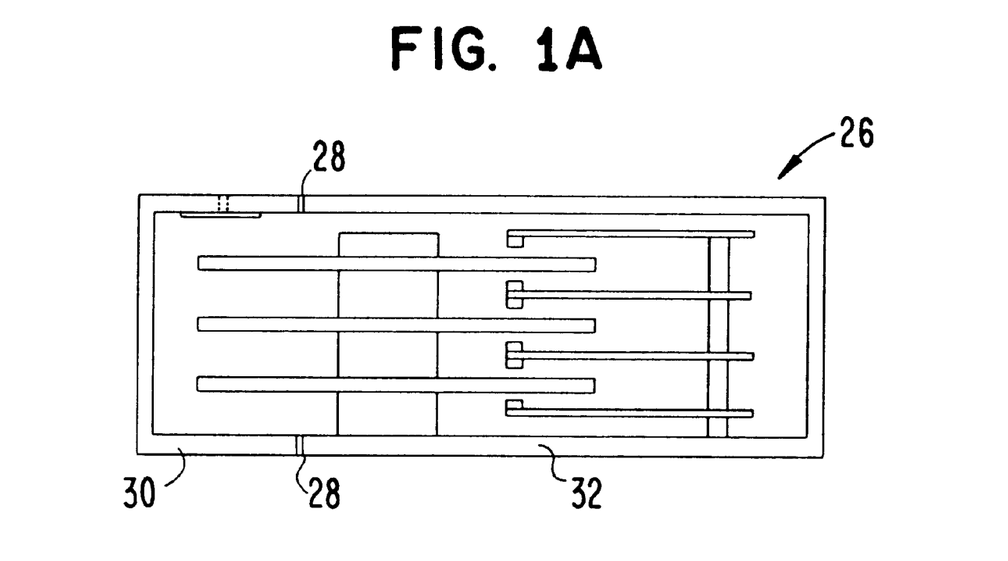
FIG. 1A is a schematic cross-sectional representation of another configuration of computer hard disk drive with another embodiment of a gasket of the present invention mounted therein.

It should be appreciated that a gasket may be constructed in accordance with the present invention to fit any present or future electronic device shape, size, or other requirements. For example, FIG. 1A shows an alternative disk drive construction. In this instance, the disk drive 26 uses a vertical gasket 28 between two side-by-side drive case halves 30, 32.

Figure 2A:
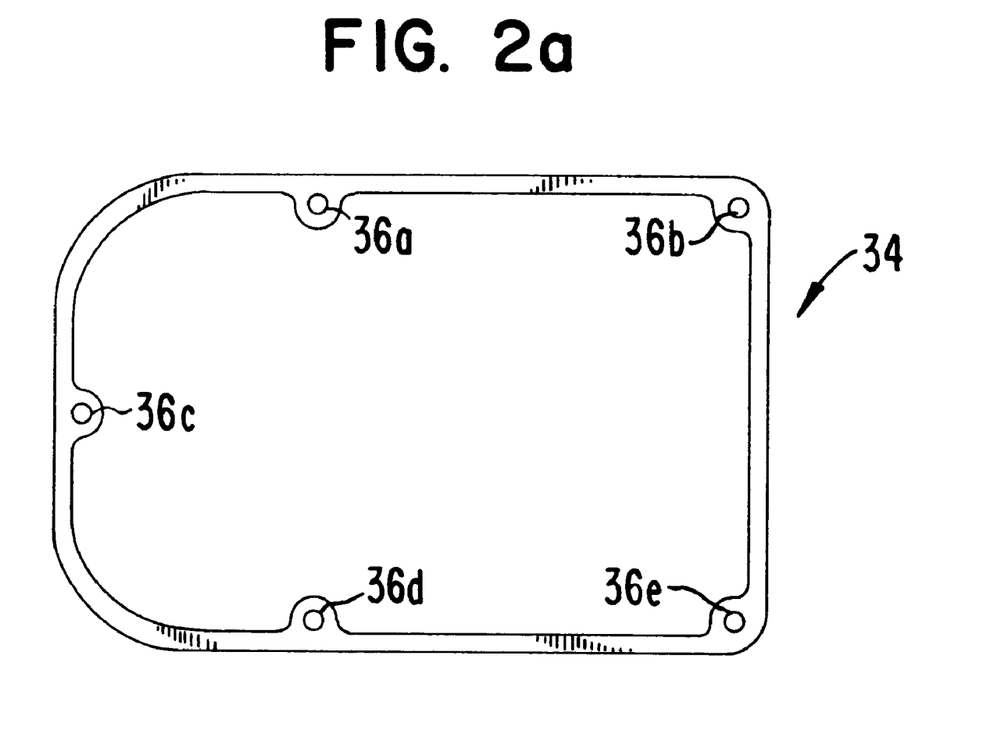
FIG. 2a is a top plan view of one embodiment of a gasket of the present invention.
Figure 2B:
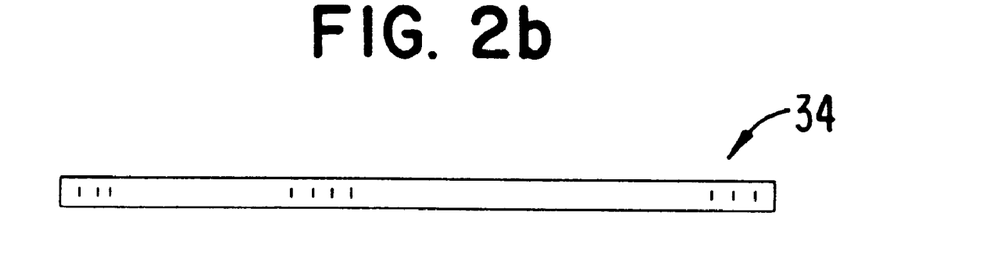

One possible configuration of a disk drive gasket 34 made in accordance with the present invention is shown in FIGS. 2a and 2b. In this case the gasket comprises a resilient polymeric material with typical dimensions of about 7.5 cm long, 5.0 cm wide, and 0.08 cm thick. Apertures 36a, 36b, 36c, 36d, and 36e are provided to assist in holding the gasket in place around anchoring screws (not shown). This embodiment may also include adsorbent or conductive particle options discussed below.

The polymeric material used in the gasket of the present invention comprises a polytetrafluoroethylene (PTFE), or similar fluoropolymer or a polyolefin material, such as ultra-high molecular weight polyethylene, and other long-chain polymers, and particularly those with high modulus of crystallinity (e.g., polyvinyl alcohol (PVA), poly(ethylene terephthalate) (PET), polyvinylidene fluoride (PVDF), etc.). The preferred material comprises an expanded PTFE made in accordance with the teachings of U.S. Pat. No. 3,953,566 to Gore, incorporated by reference. This material forms a porous network of polymeric nodes interconnected by polymeric fibrils with many operating advantages, such as cleanliness, relatively high strength, exceptional chemical resistance, high temperature resistance, and exceptionally long life without degradation or out-gassing. Unfortunately, as has been explained, when expanded PTFE is employed as a gasket it tends to permanently distort due to compressive forces and generally has insufficient resilience to permit reuse.

In the present invention it has been determined that a reusable PTFE gasket can be created with sufficient resilience to resist densification by forming a gasket in the manner disclosed in co-pending U.S. patent application Ser. No. 023,642, filed Feb. 26, 1993. As is disclosed therein, a polymer, such as PTFE, may be expanded by employing expandable microspheres blended into a polymer/microsphere composition. Such microspheres comprise a plastic coating surrounding an expandable liquid or gaseous volatile fluid. As is explained in U.S. Pat. No. 3,615,972 issued Oct. 26, 1971, to Morehouse et al., thermoplastic microspheres are adapted to expand dramatically when exposed to heat.

Expandable thermoplastic microspheres are monocellular particles comprising a body of resinous material encapsulating a volatile fluid. When heated, the resinous material of thermoplastic microspheres softens and the volatile material expands—causing the entire microsphere to increase substantially in size. On cooling, the resinous material in the shell of the microspheres ceases flowing and tends to retain its enlarged dimension; the volatile fluid inside the microsphere tends to condense, causing a reduced pressure in the microsphere.

Such thermoplastic microspheres are now commercially available from Nobel Industries Sweden, Sundsvall, Sweden, under the trademark EXPANCEL®. These microspheres may be obtained in a variety of sizes and forms, with expansion temperatures generally ranging from 80 to 130° C. A typical EXPANCEL microsphere has an initial average diameter of 9 to 17 microns and an average expanded diameter of 40 to 60 microns. According to Nobel Industries, the microspheres have an unexpanded true density of 1250–1300 kg/m$^3$ and an expanded density below 20 kg/m$^3$.

In one embodiment of the present invention, EXPANCEL type 091 DU is employed. This product comprises an off-white dry powder with a particle size between 5 and 50 microns. The shell of the microsphere comprises acrylonitrile or methacrylonitrile. The volatile liquid comprises isopentane.

It has been found that by mixing a dry preparation of EXPANCEL microspheres with a dispersion of PTFE or similar polymer and then heating the resulting composition, the polymer will undergo expansion in three-dimensions to achieve a porous network of polymeric nodes and fibrils. A mixture of PTFE, in the form of paste, dispersion or powder, and microspheres, in the form of dry powder or solution, are mixed in proportions of 1 to 90% by weight microspheres, with 5 to 85% by weight of microspheres being preferred. It should be appreciated that a wide range of products may be created even with a percentage of microspheres of merely 0.1 to 5% by weight; similarly, for some uses, filled products may be created with a percentage of microspheres and/or other fillers between 90 to 99 or more percent by weight. Mixture may occur by any suitable means, including dry blending of powders, wet blending, co-coagulation of aqueous dispersions and slurry filler, high shear mixing, etc.

Once mixed, preferably the resulting composition is heated to a temperature of 80 to 180° C. for a period of 0.5 to 10 minutes to activate the microspheres.

With currently available microsphere technology, if further density reduction is desired, the composition may be re-heated to a temperature of 40 to 240° C. and mechanically expanded through any conventional means, such as those disclosed in U.S. Pat. No. 3,963,566 to Gore. In fact, this material lends itself to use with a variety of mechanical expansion techniques, whether before, during and/or after microsphere expansion.

The resulting products have proven to have superior properties. For instance, the composition has proven to be an excellent electrical insulation, with typical dielectric constants in wires of 1.04 to 1.25, and typical velocities of propagation of 89–98%. Depending on application, insulations can be created with virtually any dielectric constant in these ranges or greater. From experimentation to date, it has been shown that insulations with dielectric constants of lower than 1.12 and 1.06 can also be readily produced.

Two of the improved properties of these expanded compositions are their substantial non-amorphously locked ("unsintered") dimensional stability and their exceptional elasticity/resilience to deformation. First, the polymer/microsphere compositions form a coherent mass which tend to retain their expanded dimensions without sintering or other further treatment. Additionally, the coherent mass can be formed without pre-treatment of the PTFE polymer (i.e. allowing applications for expanded PTFE without the need to extrude or otherwise treat the PTFE polymer before expansion).

Second, the polymer/microsphere composition has the ability to "puff" into a resilient cushion-like coherent mass with substantial proportions of open air spaces therein. The mass can expand in all dimensions and remains highly self-cohesive despite the dramatic increase in its dimensions and typical air space contents from 10 to 50 to 80% or more. Although not necessary, by mechanically expanding the PTFE/microsphere composition in addition to the microsphere expansion, the resulting product becomes even less dense. This "puffed" mass has proven-to be remarkably elastic and resilient to deformation. For instance, a typical expanded mass will withstand compression of 50% or more with nearly 100% rebound to original shape.

Additionally, as is explained below, the coherent mass may also be formed to be selectively porous. This permits a gasket made from this material to combine the properties of both a gasket and a particle filter—supplementing or eliminating the need for breather filters or similar devices.

As is disclosed in co-pending application Ser. No. 023,642, the expansion qualities of the polymer/microsphere compositions can be applied to create coherent expanded PTFE products in virtually any imaginable shape, including inducing expansion to occur in only predetermined directions. At least three different mechanisms may be employed in this regard—selective heating, external constriction, and/or internal constriction.

First, polymer/microsphere compositions may be selectively heated to activate expansion in only certain directions or in certain areas. In this regard, heat may be focused through any known means to activate the microspheres only in the desired locations (e.g. use of focused heat through conduction or convection, directed electrical current, or a laser).

Second, by applying external constriction in the form of a mold, expansion of the composition can be directed into only certain directions. This is a particular promising attribute in the production of various molded gasket products. Moreover, this allows for the expansion of gasket products in place to form even more effective seals between component parts. To control expansion in this context, the polymer/microsphere composite can be wrapped in a film (e.g., a plastic tube or a tape of PTFE).

Third, as is known, certain polymers can be treated to produce internal orientation of their structure so that they are resistant to expansion in certain directions. For example, by mechanically expanding PTFE in the manner previously referenced, increased tensile strength can be established in certain directions within the expanded PTFE lattice (e.g., in the x and/or y axis). Through conventional means of mechanical expansion (e.g., stretching, calendering, extruding, etc.) of the PTFE polymer in predetermined directions prior to activation of the microspheres, this should provide internal limitation of the growth of the polymer/microsphere compositions and cause growth in the unrestrained direction during activation of the microspheres.

It should be evident that one or more of these molding methods may be applied in concert to provide unique application-specific properties. Moreover, by selectively constricting the products, many different characteristics can be imparted, such as continuous PTFE products with variable densities or shapes, ribbed PTFE products, etc.

The selective expansion properties of the polymer/microsphere composition of the present invention make be particularly applicable to gasket applications. Under certain conditions it may be preferable to expand some or all of the microspheres after the gasket has been installed in place. In this manner, a customized fit can be established by "puffing" the gasket in place.

Adding to the utility of the present invention is its flexibility in possible manner of construction. For example, the polymer mixture can be made and extruded or otherwise extended into a sheet of any desired dimensions. The sheet may then be "puffed" into a resilient polymer tape that can then be die-cut or otherwise made into a desired gasket shape.

Alternatively, the sheet may be pre-cut into a gasket shape and then puffed afterwards. In this latter instance, the gasket can be actually puffed in place within a joint to provide a tight, customized fit. This method of application has the added advantage of automatically accommodating different amounts of separation between a joint—providing a wider area of puffed gasket in those areas of greater separation.

A third possible method of construction is to use the polymer mixture with a mold to produce one or more gaskets simultaneously without cutting. The unexpanded mixture is inserted within a mold and then puffed to form a gasket in the shape of the mold. This method of manufacture allows for the inclusion of special features to address particular gasketing needs, such as ribs, areas of differing density, energy directing raised areas, etc. Further, this method of construction also should reduce waste from the manufacturing process—generating a minimal amount of trim or other wasted gasket material.

Figure 3:
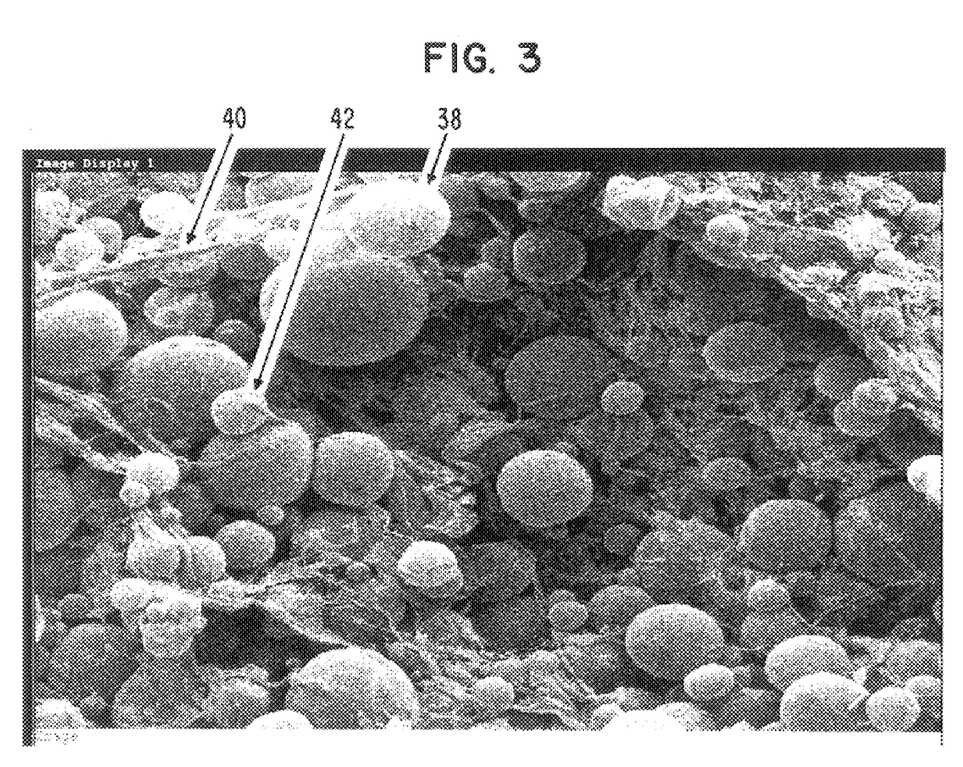
FIG. 3 is a scanning electron microscopic (SEM) image of a composition of the present invention comprising PTFE and expandable thermoplastic spheres, enlarged 150 times.

The structure of the polymer/microsphere composite of the present invention may be better understood through reference to scanning electron microscopic (SEM) images of expanded compositions made in accordance with the present invention. FIG. 3 shows an SEM image of a composition of the present invention enlarged 150 times. As can be seen, the composition comprises many expanded microspheres 38 interconnected by polymeric fibrils 40 (i.e. thread-like elements) and nodes 42 (i.e. particles from which fibrils emerge). This "scaffold" or "lattice" structure of fibrils and nodes incorporating microspheres defines substantial areas of open air spaces within the composition. It is believed to be both the voids within the microspheres 38 and these air spaces which create many of the unique properties of the present invention.

Figure 4:
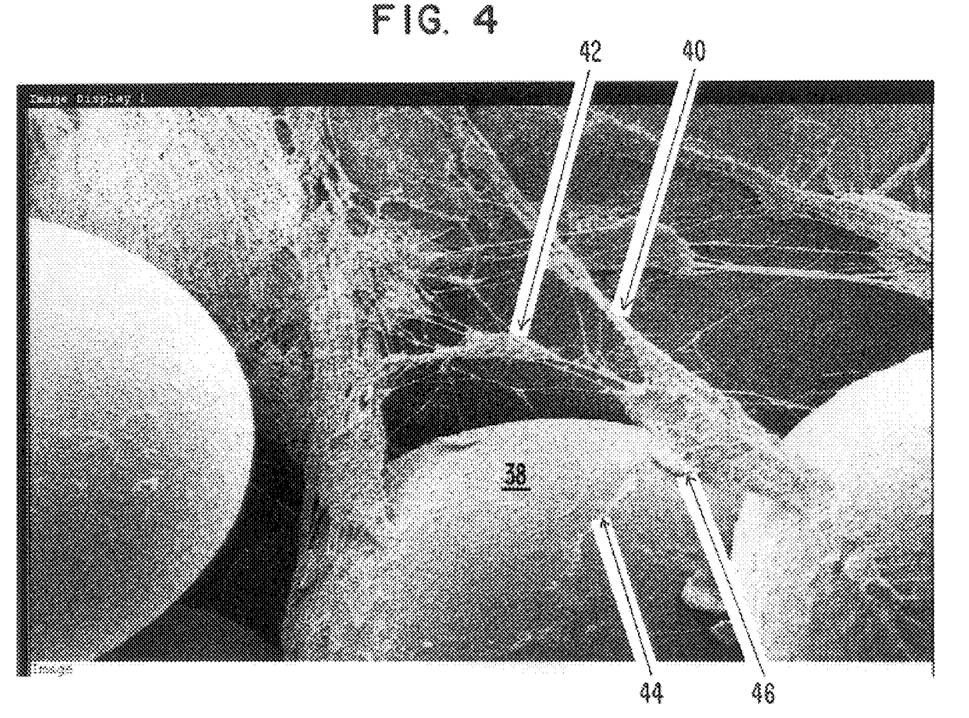
FIG. 4 is an SEM image of the composition of the present invention comprising PTFE and expandable thermoplastic spheres, enlarged 1280 times.

The particular relationship between the microspheres and the polymer can be better seen in the SEM image of FIG. 4. In this image, magnified 1280 times, the microspheres 38 can be seen attached to and embedded within fibrils 40 and nodes 42. As is shown, the polymer actually becomes attached to the microspheres, apparently with some fibrils 44 extending directly from the microspheres 38 and some nodes 46 attached directly to the surface of the microspheres 38.

For use in the present invention, the percent by weight loading of the expandable microspheres will impact the properties of the gasket. A higher percentage by weight loading will increase resilience and show greater dimensional expansion upon puffing. A lower percentage weight will be cleaner in application from a particulate standpoint as the expanded microspheres will be more entrapped with PTFE nodes and fibrils the more PTFE and less particles there are in the composition. Samples made with 5% by weight expandable microspheres have shown good resilience for reusability and good cleanliness when the composition has been examined for particles. In order to limit the amount of out-gassing from the particles, it is believed preferable to limit the microsphere proportions in the present invention to about 1 to 25% by weight of the composite.

In addition to the various properties and means of manufacturing the resilient polymeric gasket, there are also other optional additives and additions that can enhance the performance for some applications. One of those is the addition of adsorbent particles to the mix. Possible adsorbent materials include: physisorbers, such as, but not limited to, silica gel, activated carbon, activated alumina; molecular sieves or drying agents, such as clays or-super adsorbent fiber particles; or chemisorbers, such as calcium carbonate, calcium sulfate, potassium permanganate, sodium carbonate, potassium carbonate, sodium phosphate, powdered or activated metals or other reactants for chemically reacting and scavenging gas phase corrosive agents or contaminants.

Combinations may be mixed together or may be premixed or impregnated with other adsorbents. Examples are, but certainly not limited to, activated carbons, aluminas or silica gels that have been impregnated with one or more chemisorbents as mentioned above. A good broad based adsorbent is an activated carbon with a wide pore size distribution that has been impregnated with one or more chemisorbents, such as calcium carbonate and sodium carbonate. Since not all of the carbon's pores are taken up with the impregnation, this adsorbent will adsorb hydrocarbons by physisorption and react with corrosive acid gases by chemisorption.

By using the present invention as an undensified gasket or in effect combination gasket/pressure equilibration vent, all air entering the drive would be filtered from particles and vapors that could harm the interior of the enclosure provided the proper adsorbents are used and the gasket is properly sized.

Another embodiment uses conductive particles to give the gasket a degree of electromagnetic interference shielding. Activated carbon particles previously mentioned will work to some degree but regular carbon black also works well and is less expensive. Metal or other conductive microspheres would also work. The amount of shielding and, to a greater degree, the amount of conductivity is dependent upon the percentage loading and the compressive sealing force which compresses the filled polymer gasket together.

Other options include using an additional layer or layers to increase the strength, stiffness, ease of application, or adhesion of the gasket preferentially to one side of the enclosure. A thermoplastic or thermoset polymer film layer can be used to give added stiffness and resistance to stretching and tearing. Examples are, but not limited to, polyester, polypropylene, PTFE, polyethylene, nylon, polycarbonate, and fluorinated ethylenepropylene (FEP). Layers of the resilient gasket can be laminated to the stiffening layer by means of heat, ultrasonics, pressure sensitive adhesives, curable adhesives, or any other means.

Alternatively, a pressure sensitive adhesive can be applied to the polymer/microsphere composite material or to one side of a stiffening layer that has been laminated to a layer of the composite material. This allows easy installation in enclosures that do not lay flat and will also insure that if an enclosure is reopened that the gasket will preferentially remain to the side of the enclosure where the pressure sensitive adhesive is applied.

The pressure sensitive adhesives can be applied as a transfer tape, a double-sided tape, or as a coating. A solvent based adhesive or water based adhesive with a wetting agent can be used to allow the adhesive to soak into the voids of the polymeric structure to make an adhesive saturated or partially saturated gasket which can increase the adhesive strength and further increase the z-direction strength of the gasket.

Many commercially available adhesives exist. Many are tailored to specific market needs. Adhesives exist that are designed to be very low in out-gassing for cleanliness requirements. Other adhesives are FDA approved for medical applications. Still others are designed for high temperature applications and others with very high peel strengths. One commercially available transfer tape that has high peel strength and is low in out-gassing is 3M 9457 commercially available from Minnesota Mining Manufacturing Inc. of Minneapolis, Minn. A double-sided adhesive tape using a similar A-40 pressure sensitive acrylic adhesive is 3M 415, also commercially available from the above mentioned company.

The versatility of this gasket and the ability to now have a clean, resilient, breathable and filtering gasket lends it to a very large variety of applications including, but not limited to, electronic boxes, computer disk drives, optical devices and any other application that desires a seal from outside contaminating particles and vapor contaminants as well as the potential for air tight seals with appropriate sealing pressures. Also, the ability to puff after installation to preferentially expand into the largest and hardest to seal voids greatly adds to its versatility. The fact that even the breathable gasket applications are waterproof also has value in certain gasketing applications that require weatherproofing such as automotive or other demanding gasketing applications.

Samples of various layered constructions of the present invention are illustrated in FIGS. 5 through 9.

Figure 5:
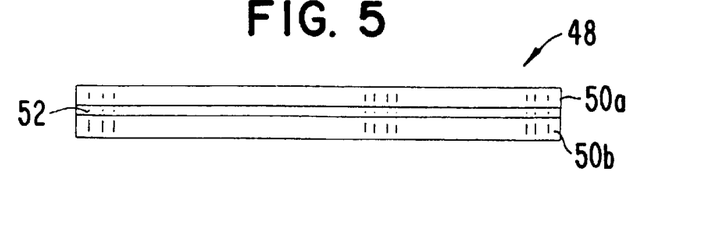
FIG. 5 is a side elevational view of a three-layer embodiment of the gasket of the present invention, where two layers of the resilient polymer gasket are laminated on either side of a polymer support film.

FIG. 5 shows a three-layer embodiment of a gasket 48 of the present invention. In this embodiment, two layers of polymer/microsphere composite material 50a, 50b are laminated on either side of a polymer support film 52. The support film serves to stiffen the gasket and provide other benefits, such as resistance to stretching or losing shape, ease of application, and ease of removability. Suitable support films include, but are not limited to, polyester, polypropylene, PTFE, polyethylene, nylon, polycarbonate, and fluorinated ethylenepropylene (FEP).

Figure 6:
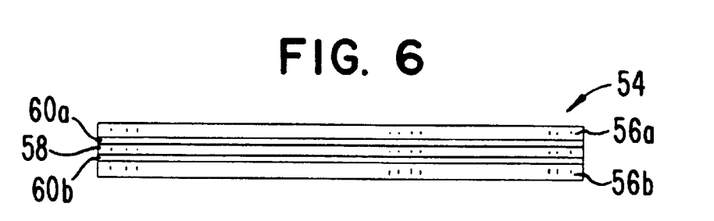
FIG. 6 is a side elevational view of a five-layer embodiment of the present invention where the two layers of the resilient polymer gasket material are laminated on either side of a double-sided pressure sensitive adhesive tape.

FIG. 6 shows a five-layer gasket 54 of the present invention. Two layers of the gasket 54 comprise polymer/microsphere composite material 56a, 56b. The composite material layers 56a, 56b are laminated on either side of a polymer film substrate 58 using two layers of adhesive 60a, 60b. Alternatively, film 58 and adhesive layers 60a, 60b may comprise a double sided pressure sensitive adhesive tape. The polymer film may comprise any of the previously mentioned support films. The pressure sensitive tape may comprise acrylic, rubber, or silicone based pressure sensitive adhesives. The advantage of this construction over that shown in FIG. 5 is the ease of manufacturing without the need to laminate the polymer/microsphere composite material to the polymer support film.

Figure 7:
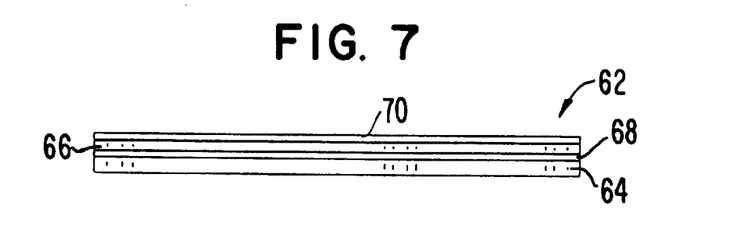
FIG. 7 is a side elevational view of a four-layer embodiment of the present invention where the resilient polymer gasket material is on one side of a double-sided adhesive tape to give support.

FIG. 7 shows a four-layer embodiment of a gasket 62 of the present invention. This construction is similar to that shown in FIG. 6, but employs only one layer of polymer/microsphere composite material 64. Again, the composite material 64 is mounted to a support film 66 by adhesive layer 68. The opposite side of the support film 66 contains pressure sensitive adhesive layer 70, which is left exposed. This construction is particularly useful for applications where it is desirable to retain the gasket in a centered orientation before sealing it in place. Also, this construction may be used where preferential attachment of the gasket to one side of a component is needed. Again, a double sided adhesive tape may be used for film 66 and adhesive layers 68 and 70.

Figure 8:
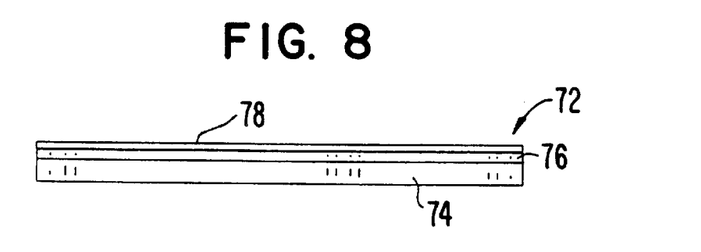
FIG. 8 is a side elevational view of a three-layer embodiment of the present invention where the resilient polymer gasket laminated to a polymer support film and a layer of adhesive is applied to the opposite side of the polymer support film.

FIG. 8 is a three-layer embodiment of a gasket 72 of the present invention. A polymer/microsphere composite material 74 is attached directly to a support film 76 by through a lamination process, such as thermal or ultrasonic lamination. The opposite side of the support film 76 is again attached to a layer of adhesive 78 to permit attachment to a component.

Figure 9:
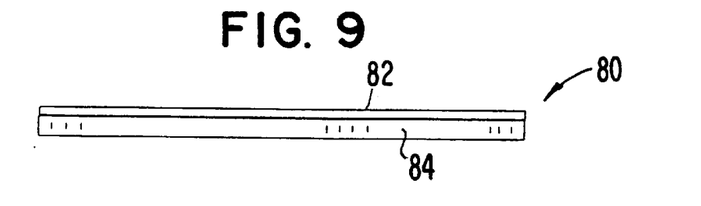
FIG. 9 is a side elevational view of a two-layer embodiment of the present invention, where an adhesive is applied directly to the resilient polymer gasket.

FIG. 9 is a two-layer gasket 80 of the present invention. In this embodiment, an adhesive layer 82 is applied directly to a polymer/microsphere composite material 84.

Without intending to restrict the scope of the present invention, the following represent examples of various formulations of polymer/expandable microsphere compositions which may be used in the present invention.

EXAMPLE 1

A 5% EXPANCEL/95% PTFE by weight sample was made by the following method: A slurry of 7.8 g of EXPANCEL—091 DU obtained from Nobel Industries, 1519 Johnson Ferry Road, Marietta, Ga. 30062, and 551.2 g of de-ionized water was prepared in a 2 liter baffled stainless steel container. While the slurry was agitating at 800 RPM, 148.2 g of PTFE in the form of a 20.0% dispersion was rapidly poured into the vessel. The PTFE dispersion was an aqueous dispersion obtained from ICI Americas, Inc. After 30 seconds, 2.2 g of a 0.4% solution of a cationic modified polyacrylimide was added to initiate the co-coagulation. After a total of 1 minute 20 seconds, the mixer was stopped. The coagulum settled to the bottom of the vessel and the effluent was clear.

The coagulum was dried at 110° C. in a convection oven. The dried cake was chilled below 0° C. It was hand ground through a 0.635 cm mesh stainless steel screen. A 35 g sample of screened powder was lubricated with mineral spirits at a ratio of 0.375 cc solvent per gram of powder. The mixture was chilled, passed through a 0.635 cm mesh screen again, tumbled, then allowed to sit at 18° C. for 16 hours and was re-tumbled.

A 2.54 cm diameter pellet was formed in a cylinder at 200 psi. The pellet was then extruded through a 0.254 cm diameter die at a ram rate of 50.8 cm/min.

The extruded beading was then dried at 105° C. in a convection oven for 1 hour. A 19.04 cm long piece of the dried extrudate measuring 0.297 cm in diameter, weighing 1.924 gms, and a calculated density of 1.457 g/cc was then-placed in a convection oven at 165° C. for 3 minutes to "puff" the microspheres (i.e. heat activating and subsequent growing of the spheres). Upon removal from the oven the sample was measured to be 28.1 cm long, having a diameter of 0.569 cm, a weight of 1.918 g, and a calculated density of 0.268 g/cc.

EXAMPLE 1a

A 15.0 cm long section was cut from the sample produced in Example 1. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 49.0 cm long, 0.399 cm in diameter, weight of 0.343 g., with a calculated density of 0.056 g/cc.

EXAMPLE 2

A 15% EXPANCEL/85% PTFE by weight sample was made by using the same method as Example 3 except the following component amounts were used:

Slurry of 23.4 g of EXPANCEL—091 DU and 613.6 g of de-ionized water 132.6 g of PTFE in the form of a 20.0% dispersion 2.1 g of a 0.4% solution of a cationic modified polyacrylimide 35 g sample of screened powder was lubricated with mineral spirits at a ratio of 0.375 cc solvent per gram of powder.

A 19.04 cm long piece of the dried extrudate measuring 0.297 cm in diameter, weighing 1.827 g and a calculated density of 1.383 g/cc was then placed in a convection oven at 165° C. for 3 minutes. Upon removal from the oven the sample was measured to be 37.3 cm long, having a diameter of 0.828 cm, a weight of 1.807 g, and a calculated density of 0.090 g/cc.

EXAMPLE 2a

A 15.0 cm long section was cut from the sample produced in Example 4. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 21.5 cm long, 0683 cm in diameter, weight of 0.239 g, and a calculated density of 0.030 g/cc.

EXAMPLE 2b

Using the same procedure and sample size as Example 4a the following sample was produced. The sample measured to be 42.0 cm long, 0.612 cm in diameter, weight of 0.240 g, and a calculated density of 0.019 g/cc.

EXAMPLE 2c

A 15.0 cm long section of dried extrudate was cut from the product of Example 4 measuring 0.297 in diameter. A 5.0 cm long section was marked off in the center of this piece using an indelible marker. The sample was placed in a convection oven at 115° C. for 7 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 64.1 cm long, 0.287 cm in diameter, weight of 0.474 g, with a calculated density of 0.114 g/cc. This sample was then placed unrestrained in a convection oven at 165° C. for 3 minutes. Upon removal from the oven, the sample had a length of 30 cm, a diameter of 0.533 cm, a weight of 0.471 g and a calculated density of 0.070 g/cc.

EXAMPLE 3

A 25% EXPANCEL/75% PTFE by weight was made by using the same method as Example 1 except the following component amounts were used:

Slurry of 39.0 g of EXPANCEL—091 DU and 676.1 g of de-ionized water 117.0 g of PTFE in the form of a 20.0% dispersion 2.0 g of a 0.4% solution of a cationic modified polyacrylimide 35 g sample of screened powder was lubricated with mineral spirits at a ratio of 0.375 cc solvent per gram of powder.

A 19.04 cm long piece of dried extrudate measuring 0.297 cm in diameter weighing 1.690 g and a calculated density of 1.280 g/cc was then placed in a convection oven at 165° C. for 3 minutes. Upon removal from the oven the sample was measured to be 40.2 cm long, having a diameter of 0.955 cm, and a weight of 1.666 g, and a calculated density of 0.058 g/cc.

EXAMPLE 3a

A 15.0 cm long section was cut from the 0.955 cm diameter sample produced in Example 3. A 5.0 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 27.0 cm long, 0.648 cm in diameter, weight of 0.203 g, and a calculated density of 0.023 g/cc.

EXAMPLE 3b

A sample of the dried extrudate measuring 0.297 cm in diameter from Example 3 was then tested for breakstrength on a Instron Model 1130. Gauge length (distance between clamps) was two inches. Samples were pulled apart at 10 inches/min with maximum tensile force being recorded. The sample was measured to have a breakstrength of 0.77 lbs.

A sample of the 0.955 cm diameter from Example 3 was then tested for breakstrength on a Instron Model 1130. Gauge length (distance between clamps) was two inches. Samples were pulled apart at 10 inches/min with maximum tensile force being recorded. The sample was measured to have a breakstrength of 1.78 lbs.

EXAMPLE 4

A slurry of 2610 g of EXPANCEL—091 DU and 45.2 Kg of de-ionized water was prepared in a 30 gallon stainless steel container. While the slurry was agitating, 7.83 Kg of PTFE in the form of a 20.0% dispersion was rapidly poured into the vessel. The PTFE dispersion was an aqueous dispersion obtained from ICI Americas, Inc. After 20 seconds, 147 g of a 0.4% solution of a cationic modified polyacrylimide was added to initiate the co-coagulation. After a total of 1 minute 44 seconds, the mixer was stopped. The coagulum settled to the bottom of the vessel and the effluent was clear.

The coagulum was dried at about 110° C. in a convection oven. The dried cake was chilled below 0° C. It was hand ground through a 0.635 cm mesh stainless steel screen. A sample of screened powder was lubricated with mineral spirits at a ratio of 0.265 cc solvent per gram of powder. The mixture was chilled, passed through a 0.635 cm mesh screen again, tumbled, then allowed to sit at 18° C. for 16 hours and was re-tumbled.

The powder was then extruded through a 10.1 cm diameter barrel and a 0.203×15.2 cm die at a ram rate of 100 cm/min.

The extruded tape was then allowed to air dry in ambient conditions overnight.

EXAMPLE 4a

A piece of the dried extrudate made in accordance with Example 4 was then placed in a convection oven at 165° C. for 5 minutes. Upon removal from the oven the sample was measured to be 33.3 cm long, 19.4 cm wide, 1.4 cm thick, a weight of 69.72 g, and a calculated density of 0.077 g/cc.

EXAMPLE 4b

Another sample was produced in the same manner as Example 4. A 10 cm long section was marked off in the center of this piece using an indelible marker. The sample was placed in a convection oven at 165° C. for 3 minutes. The sample was then grabbed by hand outside of the marks using high temperature gloves. Upon removal from the oven, the sample was immediately and rapidly stretched by separating hands. The time of stretch was estimated to be approximately 0.25 seconds. The sample was then cut at the marks and measurements were taken on the center section. The sample measured to be 34.7 cm long, 14.3 cm wide, 1.21 cm thick, a weight of 19.64 g, and a calculated density of 0.033 g/cc.

EXAMPLE 4c

Another sample was produced in the same manner as Example 4. This material was measured to have a thickness of 0.208 cm and a width of 14.8 cm. The material was then additionally processed by calendering between two metal rolls using the following gap sizes and output speeds in nine successive steps:

| Steps | 1 | 2 | 3 | 4 | 5 | 6 | 7 | 8 | 9 |
|---|---|---|---|---|---|---|---|---|---|
| GAP (cm) | 0.155 | 0.091 | 0.051 | 0.025 | 0.010 | 0.003 | 0.003 | <.003 | <.003 |
| SPEED (m/min) | 5.5 | 6.1 | 7.0 | 6.7 | 5.2 | 6.4 | 6.1 | 6.1 | 6.1 |

The calendered material had a thickness of 0.0077 cm and a width of 13.2 cm. The material was then placed in a convection oven at 165° C. for 5 minutes. A length of material was cut from the sample and measured to be 44.5 cm long, 39.4 cm wide, 0.036 cm thick, a weight of 5.30 g, and a calculated density of 0.084 g/cc.

EXAMPLE 4d

A moisture vapor transmission rate test (MVTR) on samples of Examples 4a, 4b, and 4c was conducted. This test apparatus consists of a reservoir filled with distilled water maintained at 23° C. The reservoir is covered by a porous expanded polytetrafluoroethylene (ePTFE) membrane having a high moisture vapor transmission rate (MVTR). Cups having a mouth diameter of 3.5 inches are prepared by partially filling the cup with potassium acetate and then covering the mouth of the cup with the same high MVTR ePTFE membrane.

Samples to be tested are then placed on the membrane covering the reservoir and weighed cups of the potassium acetate are placed membrane side down onto the samples. A weighed control cup of potassium acetate is placed membrane side down directly onto the reservoir membrane. After 30 minutes, the cups of potassium acetate are weighed. The weight gain is calculated and then MVTR expressed in $[(gm/meter^2)/24 \text{ hours}]$ is calculated using the following formula:

$$\text{MVTR} = [\text{weight gain (gm)}] \times [433960/\text{Test time (min)}]$$

Samples from the above Examples 4a, 4b and 4c were tested in the above described manner. The samples were of sufficient size to enable 3 cups to be placed on Example 4a, 5 cups on Example 4b, and 5 cups on Example 4c. The results of this test are summarized in the following tables:

| SAMPLE ID | CUP # | WT. GAIN | MVTR |
|---|---|---|---|
| CONTROL | 1 | 0.840 GMS | 12237 |
| EXAMPLE 4a | 2 | 0.084 GMS | 1219 |
| EXAMPLE 4a | 3 | 0.070 GMS | 1013 |
| EXAMPLE 4b | 4 | 0.085 GMS | 1230 |
| EXAMPLE 4b | 5 | 0.141 GMS | 2040 |
| EXAMPLE 4b | 6 | 0.124 GMS | 1794 |
| EXAMPLE 4b | 7 | 0.132 GMS | 1909 |
| EXAMPLE 4b | 8 | 0.143 GMS | 2068 |
| EXAMPLE 4b | 9 | 0.191 GMS | 2763 |
| CONTROL | 1 | 0.799 GMS | 11558 |
| EXAMPLE 4c | 2 | 0.741 GMS | 10719 |
| EXAMPLE 4c | 3 | 0.795 GMS | 11500 |
| EXAMPLE 4c | 4 | 0.707 GMS | 10227 |
| EXAMPLE 4c | 5 | 0.713 GMS | 10314 |
| EXAMPLE 4c | 6 | 0.730 GMS | 10559 |

Surprisingly, these rates of moisture vapor transmission are comparable to many much thinner "breathable" fabric laminates now on the market.

EXAMPLE 4e

A coagulum was prepare as in Example 4. The coagulum was dried at 110° C. in a convection oven. The dried cake was chilled below 0° C. It was hand ground through a 0.635 cm mesh stainless steel screen. The screened powder was lubricated with mineral spirits at a ratio of 0.265 c solvent per gram of powder. The mixture was chilled, passed through a 0.635 mesh screen again, tumbled, then allowed to sit at 18° C. for 16 hours and was re-tumbled.

A 10 cm diameter pellet was formed in a cylinder at 200 psi and then extruded through a 0.203×15.2 cm die at a ram rate of 100 cm/min. The extruded tape was allowed to air dry in ambient conditions overnight.

A piece of the dried extrudate was cut and measured to be 15.2 cm long, 14.0 cm wide, and 0.0206 cm thick. The piece was placed in a convection oven at 165° C. for 6 minutes to puff the material. Upon removal from the oven, the piece measured to be 39.8 cm long, 27.8 cm wide, and 0.940 cm thick, thus showing growth in the length (x), width (y), and thickness (z) dimensions. The ratio of growth in the x direction was 2.6, in the y direction was 2.8, and in the z direction was 4.6.

Comparative tensile properties of the before and after puffed materials were performed using ASTM D882 test method for the x and y dimensions, and ASTM D952 for the z dimension. All of the samples tested were of the same cut x and y dimensions, however, since the samples grew significantly in all dimensions when puffed, it was necessary to normalize the data to account for this growth in order to simulate the total strength gained by the entire sample.

For the x-direction tensile measurements, the puffed tensile value must be multiplied by the ratio of y-direction growth in order to normalize the data ("normalizing ratio"). Conversely, for the y-direction tensile measurements the puffed tensile value must be multiplied by the ratio of x-direction growth in order to normalize the data. For the z-direction tensile measurements, the puffed tensile value must be multiplied by the product of the ratios of both the x and y direction growth in order to normalize the data. The following table shows the raw and normalized data for the tensile tests.

| | Stress at max load pre-puff (lbs. force) | Stress at max load puffed (lbs. force) | Normalizing ratio | Normalizing stress at max load puffed (lbs. force) |
|---|---|---|---|---|
| X | 5.35 | 3.68 | 2.8 | 10.3 |
| Y | 13.0 | 6.95 | 2.6 | 18.1 |
| Z | 29.9 | 29.1 | 7.3 | 212.4 |

By comparing the stress at maximum load of the pre-puffed sample versus the normalized stress at maximum load of the puffed sample, it is demonstrated that total strength of the sample has increased in all dimensions.

EXAMPLE 5

A slurry was mixed consisting of 15.14 g of PTFE in the form of a 60.0% dispersion and 14.91 g of EXPANCEL—091 DU and 10.19 g of distilled water. This yields a solids content of 50% PTFE to 50% EXPANCEL. The PTFE dispersion used was part number TE 30, an aqueous dispersion obtained from E. I. duPont de Nemours and Company, Wilmington, Del. ("Dupont Company").

The slurry was then painted onto a ⅜ inch diameter copper tube using a conventional paint brush and allow to air dry at ambient conditions for 1 hour. The tube was then placed in a convection oven at 165° C. for 3 minutes to expand the EXPANCEL micro-balloons. The tube was then removed and inspected. Good adhesion properties between the coating and the tube were observed.

EXAMPLE 6

A slurry was mixed consisting of 20.94 g of PTFE in the form of a 60.0% dispersion and 27.88 g of EXPANCEL—091 DU and 3.5 g of distilled water. This yields a solids content of 43% PTFE to 57% EXPANCEL. The PTFE dispersion used was part number TE 30, an aqueous dispersion obtained from Dupont Company.

A 24 gauge silver plated copper wire was "dipped" coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside an expanded PTFE tube (e.g. tubing produced according to U.S. Pat. No. 3,953,566 to Gore) of the same length having an inside diameter (I.D.) of 2 mm, an outside diameter (O.D.) of 3 mm, and a porosity of 70%. The assembly was then placed in a convection oven for 3 minutes at 165° C. in order to puff the wire coating so that it fills the annular space between the wire and the PTFE tubing. The sample was removed and allowed to cool. The density of the puffed coating was calculated to be 0.096 g/cc using the known weight and volume of the puffed coating.

The wire assembly was then helically wrapped with aluminized polyester film and tested for velocity of propagation (V.P.). A Techtronics Model CSA 803 was used in TDR mode (time domain reflectometry) to measure velocity of propagation. A cable length of 5.47 ft was measured to have a signal delay of 1.055 ns/ft, which converts to a signal speed of $2.889 \times 10^8$ meters/sec. This signal speed divided by the speed of light in a vacuum ($2.998 \times 10^8$ m/s) yields a V.P. of 96.36%. From this value, the dielectric constant (Er) can be calculated using the equation: $V.P.=1/\sqrt{Er}$. Er for this cable calculates to be 1.077.

EXAMPLE 7

A slurry was mixed consisting of 7.36 g of PTFE in the form of a 60.0% dispersion and 13.67 gms of EXPANCEL—091 DU and 4.5 g of distilled water. This yields a solids content of 35% PTFE to 65% EXPANCEL. The PTFE dispersion used was part number TE 30, an aqueous dispersion obtained from Dupont Company.

A 33 gauge silver plated copper wire was dipped coated with the above slurry by inserting the wire through a small hole in the bottom of the mix container and drawing the wire upwards through the bath. The wire was then hung vertically to dry for approximately 30 minutes at ambient conditions.

The 3.5 ft section of dried coated wire was inserted inside a 43 mil I.D. copper tube of the same length. The assembly was then placed in a convection oven for 4 minutes at 165° C. in order to puff the wire coating so that it fills the annular space between the wire and the copper tubing. The sample was removed and allowed to cool.

A Techtronics Model CSA 803 was used in TDR mode (time domain reflectometry) to measure velocity of propagation. A cable length of 3.240 ft was measured to have a signal delay of 1.037 ns/ft, which converts to a signal speed of $2.939 \times 10^8$ meters/sec. This signal speed divided by the speed of light in a vacuum ($2.998 \times 10^8$ m/s) yields a V.P. of 98.03%. From this value, the dielectric constant (Er) was calculated to be 1.041.

EXAMPLE 8

The following procedure was used for making films of ultra-high molecular weight polyethylene (UHMW-PE) containing 50% EXPANCEL—091 DU by weight.

Solutions of UHMW-PE were prepared in a jacketed reaction vessel capable of maintaining solutions temperatures in excess of 130° C. The vessel was purged with flowing nitrogen. The vessel was also fitted with a thermocouple for determining the solution temperature, and a stirring paddle.

1. The vessel was initially heated to approximately 79° C., at which time 200 g of reagent grade mixed xylenes were added, and equilibrated at temperature.

2. To the stirring solvent, 4.0 g of Hostalon GUR 412 and EXPANCEL—091 DU were slowly added. In addition, 0.04 g of an antioxidant, (IRGANOX 1010) was added.

3. With continued stirring, the temperature of the oil bath was raised to 123° C. Stirring was stopped when the solution temperature reached 117° C., and the stirring paddle was removed. The solution was allowed to equilibrate at temperature for 30 minutes.

4. After equilibration, the hot solution was poured into a glass dish, and loosely covered with aluminum foil. The foil was removed after 30 minutes, and the solvent evaporated overnight.

A piece of the resulting product from the above procedure was measured to be 4.70 cm long, 1.10 cm wide, and 0.358 cm thick, a weight of 0.570 g, and a calculated density of 0.308 g/cc. This piece was placed in a convection oven at 165° C. for 5 minutes and removed. The sample had a puffed appearance. A piece was cut from the puffed sample and was measured to be 8.92 cm long, 2.04 cm wide, and 0.767 cm thick, a weight of 0.534 g, and a calculated density of 0.038 g/cc.

EXAMPLE 9

The following example demonstrates ability to mold and/or selectively puff regions of a sample. A ½-20 inch threaded sleeve was placed between two heat platens set at 200° C. and allowed to reach temperature. A length was cut from the dried extruded beading of Example 5, part of which was inserted into the metal sleeve. After two minutes the sample was removed, the sleeve removed from the sample, and the following observations were made. The region of the sample that had been placed within the sleeve had a puffed outside diameter (O.D.) of ½ inch which matched the inside diameter (I.D.) of the sleeve including the threaded profile. The region which was not inserted within the metal sleeve had a smooth profile and an O.D. of approximately ⅛ inch.

EXAMPLE 10

The following example demonstrates the use of an additional filler with a microsphere/PTFE composite.

A 15% EXPANCEL/25% Carbon Black/60% PTFE by weight sample was made by the following method:

A slurry of 13.8 g of EXPANCEL—091 DU, 23.07 g of Carbon Black, and 987 g of de-ionized water was prepared in a 2 liter baffled stainless steel container. While the slurry was agitating at 500 RPM for 3 minutes, 55.38 g of PTFE in the form of 20.0% dispersion was rapidly poured into the vessel now mixing at 800 RPM. The carbon black used was Ketjenblack type 300J obtained from Akzo Chemical, Inc. After a total of 1 minute 3 seconds, the mixer was stopped. The coagulum settled to the bottom of the vessel and the effluent was clear.

The coagulum was dried at 103° C. in convention oven. The dried cake was chilled below 0° C. It was hand ground through a 0.635 cm mesh screen again, tumbled, then allowed to sit at 18° C. for 16 hours and was re-tumbled.

A 2.54 cm diameter pellet was formed in a cylinder at 200 psi. The cylinder was heated to 100° C. and the pellet was then extruded through a 0.254 cm diameter die at a ram rate of 50.8 cm/min.

A 20 cm long piece of extrudate having a diameter of 0.302 cm was then placed in a convection oven at 165° C. for 3 minutes. Upon removal from the oven the sample was measured to be 21.2 cm long, having a diameter of 0.922 cm, and a weight of 0.989 gms with a calculated density of 0.070 g/cc.

The sample was tested for electrical resistivity using Mil G 83528A standard modified to a 4 point probe instead of a 2 point probe. During testing, the sample was compressed approximately 50%. The surface measurement was 110 ohms yielding a volume resistivity of 191 ohm-cm. An alternative testing method was also used by attaching alligator clips to the sample at a 4 inch spacing. This test yielded a result of 241 ohm-cm. A z-axis test was measured between two plates and also compressed 50%. This test yielded a result of 5.7 ohm-cm.

It should be noted that the compositions can be formed with various fillers to provide specific utility. Examples of possibly suitable fillers include: carbon black, ceramics, chemically activated materials (e.g. silica gel, activated carbon), thermoplastics, metals, metal oxides, elastomers particulates (including particles, rods, or flakes), etc.

EXAMPLE 11

A five-layer gasket similar to FIG. 4 was made using two layers of 5% EXPANCEL 091 DU/95% PTFE by weight having a puffed thickness of 0.030" (0.076 cm) each, one layer of 0.005" (0.013 cm) polyester film, and two layers of 0.001" (0.003 cm) 3M 9457 adhesive. The overall general width of the gasket was about 0.079" (0.200 cm). The gasket showed good rigidity for handling and inserting on the enclosure housing, had excellent stretching and tearing resistance, and showed good resiliency for potential reusability.

Similar material is disclosed in Japanese Laid-Open Patent Application JP 4335044, of Junkosha Company, Ltd., published Nov. 24, 1992, as well as WIPO Patent Applications WO 93/00163 and WO 93/00390 of Minnesota Mining and Manufacturing Co., each published Jan. 7, 1993, each teaching that an expanded PTFE can be formed by mixing unexpanded thermoplastic expandable microspheres into a resin of PTFE and then applying heat to expand the microspheres and the resin into an expanded mass of nodes and fibrils. It should be noted, however, that expandable microspheres presently commercially available under the trademark EXPANCEL® from Nobel Industries Sweden, Sundsvall, Sweden, have certain temperature limitations and other constraints which may restrict their range of possible uses as gasket material in high temperature or other demanding gasket applications.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A resilient gasket which comprises:

at least one layer of a composite material comprising an expanded polytetrafluoroethylene (PTFE) polymer comprising polymeric nodes interconnected by fibrils and resilient microspheres bound within the composite material by the nodes and fibrils, wherein the microspheres comprise about 1% to about 5% by weight of the composite characterized by a microstructure wherein the nodes and fibrils are created by mechanical stretching;

wherein the composite material is resistant to deformation, providing sufficient resilience to permit the gasket to be reused.

2. The resilient gasket of claim 1 wherein the polymeric material comprises an expanded polytetrafluoroethylene (PTFE) and the resilient microspheres comprise expandable thermoplastic microspheres.

3. The resilient gasket of claim 2 wherein the gasket further includes at least one layer of support film.

4. The resilient gasket of claim 1 wherein the gasket includes at least one adhesive layer to aid in the positioning of the gasket.

5. The resilient gasket of claim 1 wherein the gasket includes a polymer film layer.

6. The resilient gasket of claim 5 wherein the composite material as defined by claim 1 is laminated on both sides of the polymer film layer.

7. The gasket of claim 6 wherein the gasket includes at least one adhesive layer to aid in the positioning of the gasket.

8. The resilient gasket of claim 1 wherein the composite material includes adsorbent particles therein.

9. The gasket of claim 8 wherein the adsorbent particles are selected from the group consisting of physisorbers and chemisorbers.

10. The resilient gasket of claim 1 wherein the composite material includes conductive particles therein.

11. The resilient gasket of claim 1 wherein the gasket includes at least one layer of a polymer support film.

12. The gasket of claim 11 wherein the gasket includes at least one layer of adhesive.

\* \* \* \* \*